(12) United States Patent
Müller

(10) Patent No.: US 6,179,903 B1
(45) Date of Patent: Jan. 30, 2001

(54) MOBILE UNIT FOR CLEANING CONTAMINATED AIR

(75) Inventor: Lothar Müller, Landau (DE)

(73) Assignee: Seka Schutzbeluftung GmbH, Landau/Pfalz (DE)

( * ) Notice: Under 35 U.S.C. 154(b), the term of this patent shall be extended for 0 days.

(21) Appl. No.: 09/168,504

(22) Filed: Oct. 8, 1998

(30) Foreign Application Priority Data

Oct. 15, 1997 (DE) .......................................... 297 18 284 U

(51) Int. Cl.⁷ .................................................. B01D 46/00
(52) U.S. Cl. .................................. 96/55; 55/323; 55/337; 55/471; 55/486; 96/134; 96/139; 96/140; 96/417
(58) Field of Search ..................... 55/323, 385.2, 55/467, 337, 471, 473, 486, 487; 96/417, 419, 423, 134, 135, 139, 140, 224, 55

(56) References Cited

U.S. PATENT DOCUMENTS

| | | | |
|---|---|---|---|
| 3,308,610 | * 3/1967 | Springer et al. | 55/471 |
| 4,129,426 | * 12/1978 | Furasen | 55/472 |
| 4,210,429 | * 7/1980 | Golstein | 55/473 |
| 4,285,704 | * 8/1981 | Zuzanov et al. | 55/472 |
| 4,336,040 | * 6/1982 | Haberl | 55/472 |
| 4,339,250 | * 7/1982 | Thut | 55/467 |
| 4,377,399 | * 3/1983 | Bryson | 55/472 |
| 4,477,270 | * 10/1984 | Tauch | 96/140 |
| 4,627,862 | * 12/1986 | Frei et al. | 96/139 |
| 4,701,195 | * 10/1987 | Rosendall | 55/473 |
| 4,737,173 | * 4/1988 | Kudirka et al. | 55/472 |
| 5,120,331 | * 6/1992 | Landy | 55/473 |
| 5,240,478 | * 8/1993 | Messina | 55/472 |
| 5,641,343 | * 6/1997 | Frey | 55/472 |
| 5,753,000 | * 5/1998 | Chiu et al. | 55/472 |
| 5,803,940 | * 9/1998 | Rick et al. | 55/467 |

FOREIGN PATENT DOCUMENTS

| | | |
|---|---|---|
| 4421911 | 4/1997 | (DE) . |
| 2653354 | 4/1991 | (FR) . |

* cited by examiner

*Primary Examiner*—Duane S. Smith
(74) *Attorney, Agent, or Firm*—Friedrich Kueffner

(57) ABSTRACT

The invention is directed to a mobile arrangement for cleaning contaminated air. The arrangement has a blower unit, a filter unit, supply air lines and discharge air lines. During the cleaning process, surrounding air is sucked in by the blower unit, guided through the filter for cleaning, and finally guided out of the arrangement again. The filter unit (2) has at least one cylindrical filter element (15, 16, 17) in which an activated charcoal filter (17) is arranged at the outer side of the cylinder jacket and a solids filter (15, 16) is arranged at the inner side of the cylinder jacket.

10 Claims, 2 Drawing Sheets

MOBILE UNIT FOR CLEANING CONTAMINATED AIR

BACKGROUND OF THE INVENTION

1. Field of the Invention

The invention is directed to a mobile arrangement for cleaning contaminated including a blower unit, a filter unit, supply air lines and discharge air lines, wherein the blower unit sucks in surrounding air, guides it through the filter for cleaning, and finally guides it out of the arrangement in the cleaned state.

2. Description of the Related Art

The area of use of arrangements of the kind mentioned above is chiefly in locally defined areas such as, e.g., waste dumps, abandoned polluted sites, composting plants, manufacturing sites, etc., where pollutants are emitted as a result of the work processes carried out there. Due to evolution of gas, movements of the soil and air, etc., pollutants in the form of gas and particles pass into the air from the subsoil and are breathed in along with inhaled air by persons working in this area.

For extensive prevention of health impairment of humans, it is known to use stationary installations for cleaning breathing air. However, these installations are only for use in stationary plants such as, e.g., offices and workshop rooms. Further, the health of those persons directly exposed to the pollutants when changing from one use to another on site must also be protected. Above all, this group consists of equipment operators of earth moving machinery and utility vehicles.

Essentially three systems are known for this purpose.

One system provides that the vehicle driver carries a respirator mask or breathing protection mask and, as the case may be, a protective suit. However, this involves a considerable restriction of comfort for the driver which, in many cases, results in that the breathing protection masks are not worn. Further, breathing protection masks and protective suits are subject to limited wearing periods, so that a continuous operation over long periods of time can be maintained only with difficulty.

For this reason, solutions have been developed which supply the cleaned air directly to the driver's cab. The driver can accordingly move within his cab without being hampered. In one solution, steel bottles or cylinders with up to 300 bar of compressed breathing air are installed outside of the cab. The breathing air is supplied to the driver's cab from the cylinders. When the cylinders are empty, they are generally refilled or exchanged for full cylinders.

Aside from the burdensome changing of cylinders or the time-consuming filling at a container station with high-pressure compressors, the distance to the station, whose length depends on the size of the dump, also restricts the use of this solution to exceptional cases. Further, the procurement and maintenance of these systems is very expensive and requires very highly qualified operators.

For this reason, mobile filter arrangements came to be arranged usually at the outer side of the vehicles. These arrangements suck air from the environment, direct this air through a filter and deliver the air which has been cleansed of harmful substances in this way into the driver's cab. Energy is supplied by a d.c. generator of the vehicle.

A mobile arrangement is known from DE-PS 44 21 911 C2, wherein the air is conducted into the filter over the outer side of the outer surface of the filter. The air flows through the filter radially in the direction of the longitudinal axis of the filter and exits the filter in a cleaned state in the region of the longitudinal axis of the filter.

With respect to construction, the filter is usually carried out in such a way that the contaminated air first flows through a coarse-dust filter and then through a fine-dust filter and, in doing so, is cleansed of solids particles. Once this has been accomplished, the air flows through an activated charcoal filter which eliminates the rest of the pollutants; thus, the activated charcoal filter is the final filter element in the through-flow direction.

It has been demonstrated with respect to these filters up to the present that the critical service life within a filter relates to the activated charcoal filter elements. This means that when the activated charcoal filter elements are already spent, the coarse-dust filter elements and fine-dust filter elements still have sufficient remaining filtering capacity for further operation. The filter capacity is proportional to the volume of the filter elements.

In conventional arrangements, the described relationships result in arrangements that are very large and heavy and therefore unmanageable if a reasonable service life, above all of the activated charcoal filter elements, is to be achieved. When it is desirable to construct compact arrangements, the service life of the activated charcoal filters will automatically be shortened with a reduction in volume of the activated charcoal filter, so that the activated charcoal filter element must be changed very frequently. In this case, every time the filter is changed, the question arises of whether the coarse-dust filter and fine-dust filter should also be changed although they are only partially spent, or whether they should be changed separately at a later date, which involves a special expenditure of labor.

SUMMARY OF THE INVENTION

Against this background, the object of the invention is to provide an arrangement enabling a compact and therefore manageable manner of construction without having to tolerate losses with respect to filter service life, filter capacity or maintenance effort.

In accordance with the present invention, the filter unit of the mobile arrangement for cleaning contaminated air has at least one cylindrical filter element in which an activated charcoal filter is arranged at the outer side of the cylinder jacket and a solids filter is arranged at the inner side of the cylinder jacket.

This makes it possible to divide the filter differently with respect to volume between the dust filters and the activated charcoal filter element. From the start, there is more volume available in the area of the outer surface of the filter for the filter elements arranged there because of the greater circumference in this area, while filter elements in the area around the longitudinal axis of the filter have a smaller volume due to the smaller circumference at that location.

Therefore, in the arrangement according to the invention, the volume and accordingly the service life of the coarse-dust filter and fine-dust filter are reduced, while the volume and the service life of the activated charcoal filter elements are increased at the same time. An optimum distribution of the filter volume results when the various filter elements have roughly the same service life in operation.

By making optimum use of the available filter volume, arrangements according to the invention can be produced so as to be considerably smaller, lighter and more compact. This reduces production costs on the one hand but, on the other hand, also facilitates mounting at the vehicles to be outfitted because the reduced space requirement opens up additional possibilities for attachment, also at more favorable locations. For instance, possible installation places such as, e.g., fenders, engine covers, etc., are easily accessible from the ground.

A further advantage of this arrangement consists in that all filter elements can be clamped jointly between the sealing surfaces of the front and rear ends of the filter by an individual clamping device, e.g., at the housing cover.

Due to the small dimensions and low weight, it is now also possible for the operator to disassemble the arrangement from the vehicle and send it to the manufacturer for repair/overhaul and testing. Time-consuming and costly customer service visits are obviated in this way.

A further advantage is that all of the filter elements are spent at approximately the same time and are therefore changed at the same time. This limits expenditure on changing filters to a minimum.

According to a determined embodiment form, the filter unit includes a plurality of cylindrical filter elements which can be inserted one inside the other. The compact manner of construction is benefitted in that the filter elements are adapted to one another so as to fit exactly. Each of the elements can contain a different filter, so that the filter unit can accordingly be adapted to the different pollutant emissions of the respective locations where it is used with the greatest possible flexibility.

In this regard, it is also possible to arrange two or more differently prepared activated charcoal filters one behind the other in the through-flow direction. When impregnated activated charcoal filters are combined by a person lacking the pertinent technical knowledge, these impregnated activated charcoal filters can cancel one another out with respect to their chemical action to the extent that there is contact between the filter materials. This is no longer possible due to the fact that the filter elements are inserted inside one another so as to fit exactly, since this results in a definite spatial separation of the individual filter elements.

A further possibility for variation is the additional arrangement of a radon filter. This can be arranged in the filter unit itself or in the blower unit. Further, the filter unit can be combined with an ionization tube which additionally has a sterilizing action and acts in part to decompose pollutants. An ionization tube of this kind can be arranged, for example, in the region of the longitudinal axis of the filter or in the blower unit. A cyclone can also be arranged in front of the filter element to separate out solid particles. Further, it is possible to use larger dust filters instead of the activated charcoal filter when the activated charcoal filter is not required and when only contaminated particles are concerned.

According to a further embodiment form, the fine-dust filters are constructed as Teflon, polytetraflorethylene, coated diaphragm filters. The latter can be cleaned as needed and can therefore be reused again and again. In addition, they are capable of retaining airborne bacteria and very small smoke particles.

It is also advantageous when the individual filter elements are outfitted with an electronic chip. This chip carries a determined code which is read and checked by a coil installed in the arrangement. The arrangement can only be put into operation when the code is correct. This excludes filter elements of inferior quality such as those obtainable on the accessories market from being used in the arrangements according to the invention.

Since the chips can be imprinted in addition, data concerning the filter type, filter number, time put into operation, period of operation, air humidity and temperature, and pollutant concentrations can be stored on them. Important characteristic values, e.g., the remaining service life of the individual filter elements, can be calculated by means of these data.

Further, it has proven advantageous when the blower unit has a brushless disk armature motor. This avoids abrasion of carbon brushes as occurs in conventional d.c. motors. By means of a high-power blower drive of this kind, it is possible to build up high pressure, so that a reasonable service life of the filter element can also be achieved in case of more extensive soiling. The use of Teflon-coated diaphragm filters is even a prerequisite for a high-power blower of the type mentioned above.

BRIEF DESCRIPTION OF THE DRAWING

The invention will be described hereinafter with reference to an embodiment example shown in the drawing.

DESCRIPTION OF THE PREFERRED EMBODIMENT

Figure 1:
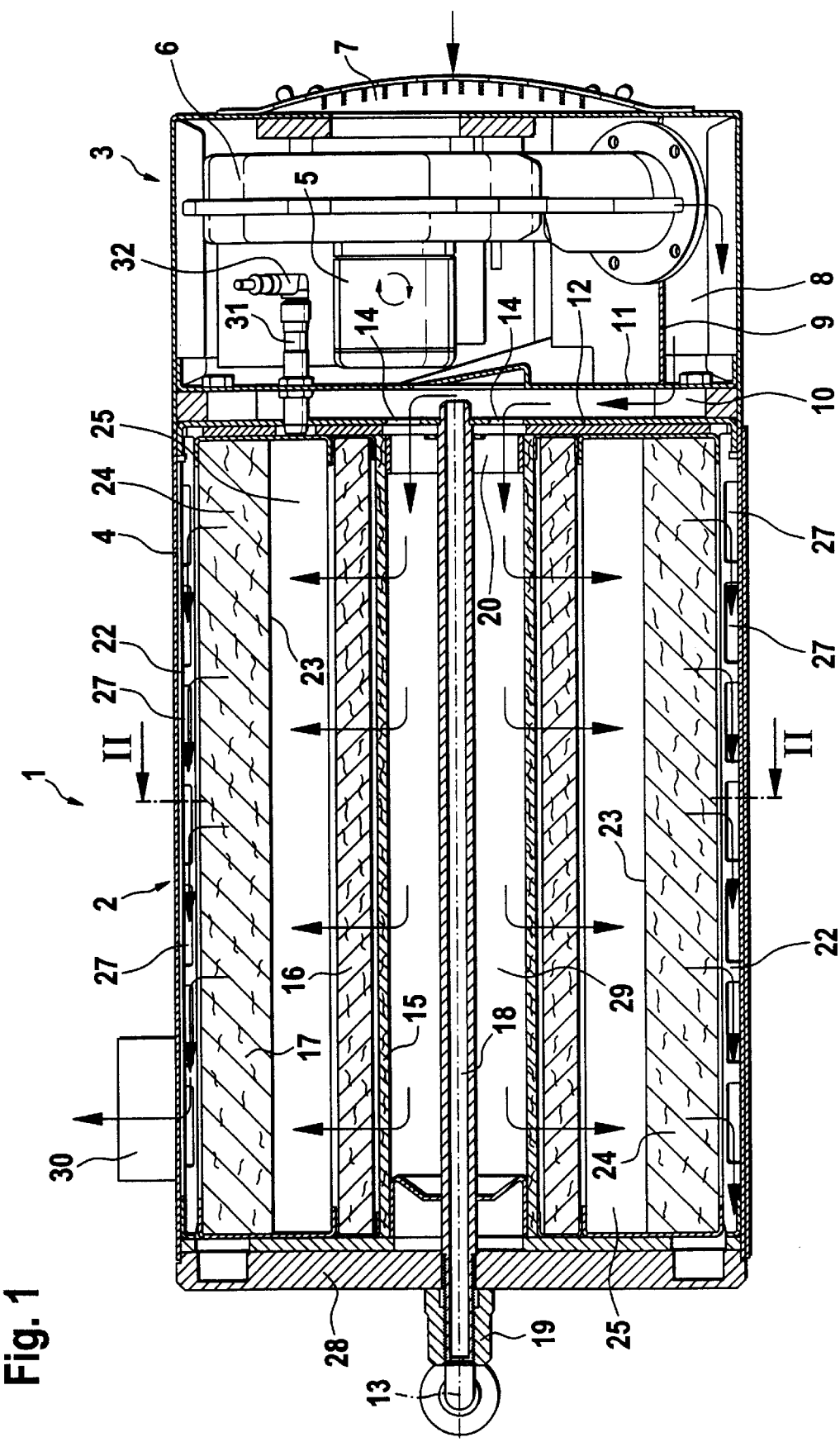
FIG. 1 shows a longitudinal section through an arrangement according to the invention along line I—I shown in FIG. 2.
Figure 2:
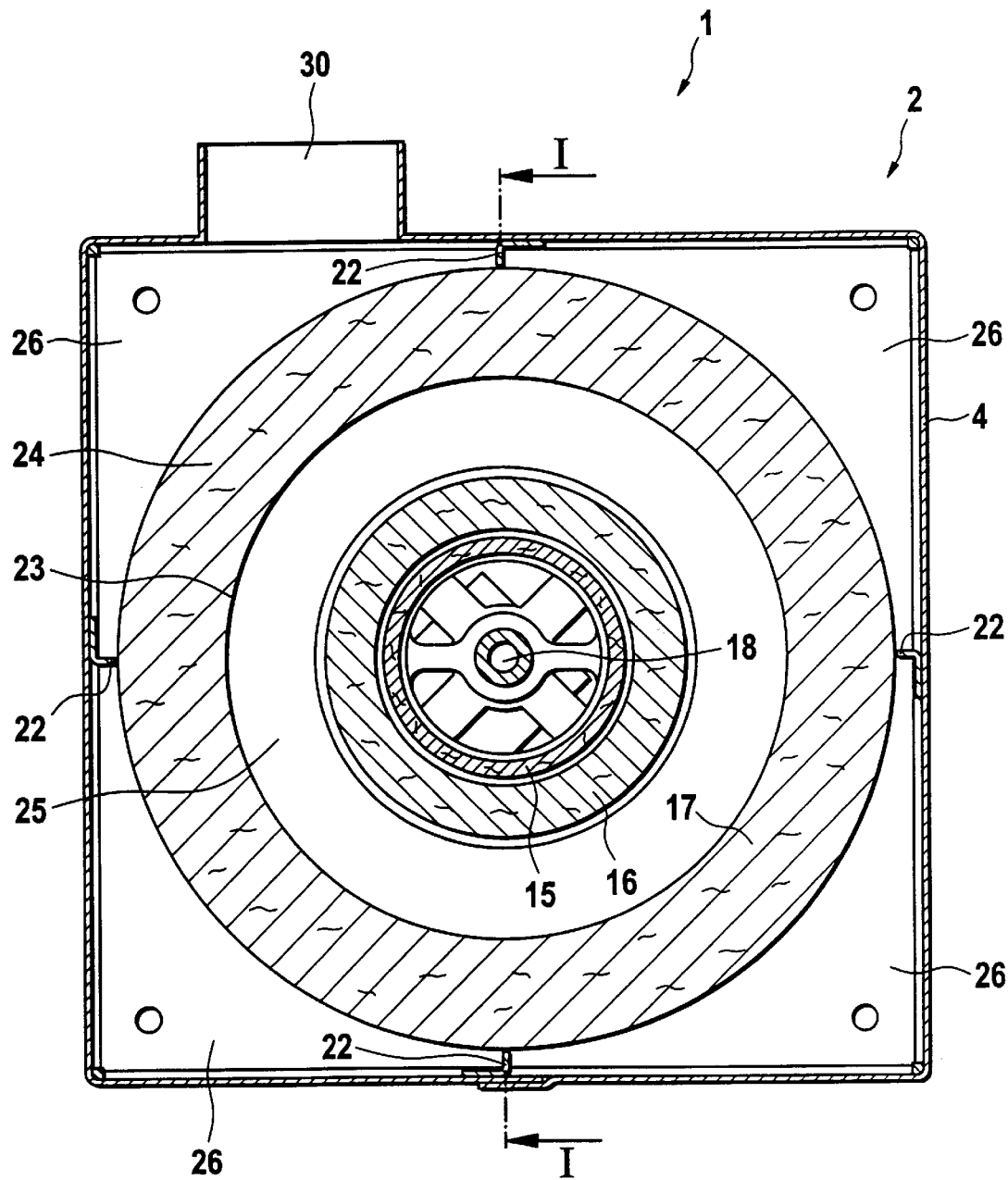
FIG. 2 shows a cross section of the arrangement shown in FIG. 1 along line II—II.

An arrangement 1 according to the invention is shown in FIGS. 1 and 2. It has a filter unit 2 and a blower unit 3. Both units are accommodated in the housing 4.

The blower unit 3 is essentially formed of a disk armature motor 5 which drives a blower 6. In this way, surrounding air is sucked into the blower 6 through the perforated plate 7 at the front and is pushed into the air channel 8. The air flow is shown by arrows. The air channel 8 is formed by the housing 4 and a plate 9 and leads to an air distribution chamber 10 which is defined by the dividing plates 11 and 12. Passages or openings 14 are arranged in the dividing plate 12 in the area around the longitudinal axis of the filter. These openings 14 allow the air flow to enter the filter unit 2 of the arrangement 1.

The filter unit 2 is essentially formed of the coarse-dust filter element 15, the fine-dust filter element 16 and the activated charcoal filter element 17 and a closing device including a threaded rod 18, a wing nut 19 and a housing cover 28.

The coarse-dust filter element 15 has a hollow-cylindrical shape with a circular cross section. It is arranged in the filter unit 2 centric to the longitudinal axis 13 of the filter. An end cap 20 which is fixedly connected with the dividing plate 12 serves as centering means.

A fine-dust filter element 16 is arranged around the coarse-dust filter element 15. Also, it has an annular cross section, wherein the inner diameter of the fine-dust filter element 16 is slightly larger than the outer diameter of the coarse-dust filter element 15. An activated charcoal filter element 17 follows the fine-dust filter element 16 in the same way farther in the direction of the housing 4. The activated charcoal filter element 17 is divided by a perforated plate 23, resulting in two hollow-cylindrical filter chambers 24 and 25 inside the filter element 17. The chambers 24 and 25 are filled with activated charcoal which is prepared differently corresponding to the pollutant emissions.

The dimensions of the housing 4 and the outer diameter of the activated charcoal filter element 17 are adapted to one another in such a way that a certain clearance is reserved at the narrowest location. However, in order that the activated charcoal filter element 17 is held centrically in the filter unit 2, four web plates 22 are arranged in this area to support the activated charcoal filter element 17 (FIG. 2).

Since the filter elements 15, 16 and 17 have a circular cross section but the housing 4 has a square cross section, air channels 26 are formed in the direction of the longitudinal axis 13 of the filter by the web plates 22 and the activated charcoal filter element 17. Recesses 27 in the web plates 22 enable an exchange of air between the individual air channels 26.

All of the filter elements 15, 16 and 17 can be inserted into the filter unit 2 independent from one another. The greatest possible flexibility is accordingly made possible with respect to the combination of the different filter elements.

A removable housing cover 28 is arranged at the front free end of the filter unit 2. It serves to fix the filter elements 15, 16 and 17 on the one hand and provides for an air-tight closure of the housing 4 on the other hand. The housing cover 28 is held in that it is pressed against the housing 4 by means of a kind of wing nut 19 which can be screwed onto the threaded rod 18.

The arrangement 1 is further outfitted with sensors 31 and 32. These sensors 31 and 32 are fastened to the dividing plate 11 and extend into the filter unit 2 by one end. The sensors 31 and 32 check for the presence of filter elements and emit a warning if a filter element is absent.

After the flow of air is guided into the filter unit 2, it can flow in the direction of the longitudinal axis 13 of the filter in the cylindrical hollow space 29 formed by the coarse-dust filter 15. Due to the overpressure generated by the blower unit 3 in the hollow space 29, the air penetrates the individual filter elements 15, 16 and 17 one after the other in the radial direction. In this way, initially larger solid particles and then smaller solid particles are retained until, finally, gaseous pollutants are eliminated in the activated charcoal filter element 17.

After flowing through the filter elements 15, 16 and 17, the cleaned air arrives in the channels 26, wherein one of the channels leads directly to the outlet neck 30 arranged in the housing 4 and the other channel leads indirectly to the outlet neck 30 arranged in the housing 4. As a rule, an air hose, not shown, which directs the cleaned air into the driver's cab of a vehicle is arranged at the outlet neck 30.

The embodiment example described above relates to a filter in which the air to be cleaned is pushed through the filter. However, it is also possible for the air which is to be cleaned to be sucked through the filter. This requires the generation of a vacuum pressure in the channels 26, for which purpose the arrangement according to the invention must be slightly modified.

The housing cover 28 on the front side of the filter unit 2 is constructed so as to allow the passage of air, but the front side of the blower unit 3 must be constructed in such a way that air cannot pass through by dispensing with the perforated plate 7. Further, passages from the channels 26 to the intake area of the blower unit 3 are only present between the blower unit 3 and the filter unit 2. Accordingly, there is no longer a direct connection between the blower unit 3 and the hollow space 29.

When the blower 6 is running, air is initially sucked out of the blower unit 3. Accordingly, air flows from the channels 26 through passages back into the blower unit 3. In this connection, a vacuum pressure is generated in the channels 26 which causes the air which is to be cleaned to flow from the hollow space 29 radially through the filter elements into the channels 26. Additional surrounding air can flow continuously through openings in the housing cover 28 into the hollow space 29.

The cleaned air is supplied to the driver's cab of the vehicle directly from the blower 6.

Patent claims:

1. Mobile arrangement for cleaning contaminated air, including a blower unit, a filter unit, supply air lines and discharge air lines, wherein the blower unit sucks in surrounding air, guides the surrounding air through the filter for cleaning, and finally guides the surrounding air out of the arrangement in a cleaned state, wherein the filter unit (2) has at least one cylindrical filter element (15, 16, 17) having a cylinder jacket, wherein an activated charcoal filter (17) is arranged at the outer side of the cylinder jacket and a solids filter (15, 16) is arranged at the inner side of the cylinder jacket.

2. Arrangement according to claim 1, wherein the filter unit (2) has a plurality of cylindrical filter elements (15, 16, 17) which are arranged so as to be displaceable one inside the other.

3. Arrangement according to claim 1, wherein the activated charcoal filter includes two parts and has at least two filter elements.

4. Arrangement according to claim 1, wherein the solids filter includes at least one of a coarse-dust filter (15) and a fine-dust filter (16).

5. Arrangement according to claim 4, wherein the fine-dust filter (16) is constructed as a polytetrafluoroethylene-coated diaphragm filter.

6. Arrangement according to claim 1, wherein the filter unit (2) has a radon filter.

7. Arrangement according to claim 1, wherein a cyclone is connected in front of the filter unit (2).

8. Arrangement according to claim 1, wherein the filter unit (2) is combined with an ionization tube.

9. Arrangement according to claim 1, wherein the lower unit (3) has a disk armature motor (5).

10. Arrangement according to claim 1, wherein the filter elements (15, 16, 17) are provided with an electronic chip which can be read and imprinted.

* * * * *